United States Patent [19]
Haupt et al.

[11] 3,880,795
[45] Apr. 29, 1975

[54] PROCESS FOR THE MANUFACTURE OF POLYCARBONATE SOLUTIONS

[75] Inventors: Heinrich Haupt; Hugh Vernaleken, both of Krefeld, Germany

[73] Assignee: Bayer Aktiengesellschaft, Leverkusen, Germany

[22] Filed: Feb. 9, 1973

[21] Appl. No.: 331,132

[30] Foreign Application Priority Data
Feb. 17, 1972 Germany............................ 2207359

[52] U.S. Cl............................ 260/33.8 R; 260/34.2
[51] Int. Cl............................................ C08c 11/24
[58] Field of Search...................... 260/34.2, 33.8 R

[56] References Cited
UNITED STATES PATENTS
3,759,865   9/1973   Emmer et al. ..................... 260/34.2

OTHER PUBLICATIONS
Polycarbonates, Christopher & Fox, pages 41–43 relied upon.

Primary Examiner—Melvyn I. Marquis
Attorney, Agent, or Firm—Lawrence S. Pope

[57] ABSTRACT

Process for the preparation of polycarbonate solutions that are particularly suitable for the production of filaments and films. The solutions are prepared by precipitating polycarbonates, in a largely crystalline form, from their solutions in polycarbonate solvents by adding specified precipitants to the solutions and thereafter redissolving the precipitated polycarbonates in their solutions by evaporating off the precipitants.

11 Claims, No Drawings

PROCESS FOR THE MANUFACTURE OF POLYCARBONATE SOLUTIONS

FIELD OF THE INVENTION

The invention relates to a process for the manufacture of polycarbonate solutions which are particularly suitable for the manufacture of filaments and films having good mechanical properties.

DESCRIPTION OF THE PRIOR ART

Polycarbonates based on aromatic dihydroxy compounds possess excellent properties which, inter alia, permit their use as raw materials for the manufacture of films and filaments.

The mechanical properties and other useful properties of these polycarbonate films and filaments, which are advantageously manufactured by either the so-called casting process or wet spinning process depend largely on what degree of crystallinity is achievable in the films or filaments after stretching.

Polymers which contain, for example, polar groups and hence have a strong tendency to crystallization, such as, for example, polyamides and polyethylene glycol terephthalates, do not require a special treatment prior to the formation of films or filaments. These films and filaments possess useful properties after a simple stretching process.

On the other hand, many polymers, including polycarbonates, do not show a pronounced tendency toward crystallization after stretching. A large number of measures, therefore, are known for improving their crystallization behavior. For example, crystallization promoters can be added to the solutions from which the films or filaments are obtained. A further process for achieving better crystallinity in polycarbonate films or filaments is to convert polycarbonate solutions, at temperatures below the melting point of the polycarbonates used, into solid solutions by withdrawing solvent under the action of shear (see OS (German published specification) No. 2,004,517). The films and filaments manufactured from these solutions in accordance with known processes show increased crystallinity and improved mechanical properties.

SUMMARY OF THE INVENTION

It has now been found in accordance with this invention that the crystallinity of filaments and films of high molecular weight polycarbonates based on aromatic dihydroxy compounds, and hence the mechanical properties and other useful properties of these filaments and films, can be substantially improved if, for their manufacture, polycarbonates are employed which: (1) have been precipitated from their solutions in a largely crystalline form by the addition to the solutions of a precipitant for polycarbonates and (2) have been subsequently redissolved by evaporating off the precipitant. The polycarbonates prepared by the process of the invention are converted into filaments and films in accordance with known processes.

DETAILED DESCRIPTION

The subject of this invention is therefore a process for the manufacture of solutions of high molecular weight polycarbonates which are particularly suitable for the production of filaments and films and which is characterized in that polycarbonates having a molecular weight of above 30,000 are precipitated in a largely crystalline form from their solutions by the addition of precipitants and the precipitated product is subsequently redissolved by evaporating off the precipitant.

As used herein the term "precipitant" is used to mean any of the so-called non-solvents for polycarbonates such as those listed in "Polycarbonates" by William F. Christopher and Daniel W. Fox (copyright 1962 by Reinhold Publishing Corporation) at pages 32 and 33.

Filaments and films obtained from solutions manufactured by this process show distinct advantages in their mechanical properties, such as, for example, tensile strength, over filaments and films which have been obtained from solutions such as those disclosed in OS (German published specification) No. 2,004,517.

The degree of crystallization achievable in the filaments and films depends on numerous parameters. These parameters include: the nature, molecular weight and concentration of the polycarbonate in the solution; the nature and the weight ratios of solvent and precipitant; and also the temperature and the dwell, or precipitation, time.

A usable characteristic value for determining the crystallinity of polycarbonates is the melt enthalpy $\Delta H_s$, or heat of melting. In the case of the precipitated polycarbonates it should be at least 5.0 cal/g, and preferably in the range of 5.5 to 8.0 cal/g.

The melt enthalpy, or heat of melting, of the precipitated polycarbonate may be measured by differential thermal analysis and more specifically by means of a differential thermal analyzer such as a duPont 900 Differential Thermal Analyzer used in conjunction with a duPont Differential Scanning Calorimeter Cell. A method of measuring this quantity is described in the duPont Instruction Manual for the 900 Differential Thermal Analyzer, Sections 15.7 through 15.12.1.

The crystallinity of polycarbonates may be also determined by radiographic measurements (Compare P. Hermans and A. Weidinger, Makromol. Chem. 64, 135 ff. (1963)).

Suitable polycarbonates are those based on aromatic dihydroxy compounds such as, for example, hydroquinone, resorcinol, 4,4'-dihydroxyphenylpropane-2,2,-bis-(4-hydroxyphenyl)-alkanes, -cycloalkanes, -ethers, -sulphides and -ketones, as well as bis-phenols which are halogenated in the nucleus and alkylated in the nucleus such as bis-(4-hydroxyphenyl)-($C_1$–$C_8$)-alkylenes, bis-(4-hydroxyphenyl)-($C_2$–$C_8$)-alkylidenes, bis-(4-hydroxyphenyl)-($C_5$–$C_{15}$)-cycloalkylenes, bis-(4-hydroxyphenyl)-($C_5$–$C_{15}$)-cycloalkylidenes, 2,2-(4.4'-dihydroxy-3.3'-5.5'-tetrachlorodiphenyl)-propane, 2,2-(4.4'-dihydroxy-3.3'-5.5'-tetramethyldiphenyl)-propane, bis-(4-hydroxyphenyl)cyclohexane-1.1, 2,2-(4,4'-dihydroxy-3,3'-dimethyl-5,5'-dichlorodiphenyl)-propane, and $\alpha,\alpha'$-bis-(p-hydroxyphenyl)-p-diisopropylbenzene. Copolycarbonates based on 4,4'-dihydroxydiphenylpropane-2,2 and 1,4-bis-(4-hydroxyphenylisopropylidene)benzene are particularly suitable, especially those in which the molar ratios of the 4,4'-dihydroxydiphenylpropane-2,2 and 1,4-bis(4-hydroxy-phenylisopropylidene)benzene are in the range of 99.8–95 mol %/0.2–5 mol %.

Further aromatic dihydroxy compounds are mentioned in the U.S. Pat. Nos. 3,028,365, 2,999,835, 3,148,172, 3,271,368, 2,970,137, 2,991,273, 3,271,367, 3,280,078, 3,014,891 and 2,999,846.

The polycarbonates are manufactured in accordance with known processes such as those described, for example, in U.S. Pat. Nos. 3,028,365 and 2,999,835 and in "Polycarbonates" by William F. Christopher and Daniel W. Fox. To achieve good filament and film qualities the molecular weight should be above 30,000 and preferably above 50,000.

Suitable solvents for the polycarbonates are any of the known polycarbonate solvents and, preferably, chlorinated hydrocarbons, such as methylene chloride, chloroform, 1,2-dichloroethane and trichloroethane, as well as chlorobenzene and dichlorobenzene. Toluene and xylene can also be used as solvents for alkyl-substituted polycarbonates.

As mentioned previously, any of the non-solvents for polycarbonates known from the literature, such as hydrocarbons, esters and ketones, can be used as precipitants. Possible hydrocarbons which can be used as precipitants are preferably those with 2–8 C atoms, and preferably aliphatic and cycloaliphatic hydrocarbons, such as, for example, ethylene, propylene, butane, isoprene, isopentane, cyclohexane, methylcyclohexane and isooctane.

Among the esters and ketones known as non-solvents, those of low molecular weights, such as formic acid methyl ester and acetone, are to be preferred as precipitants. Furthermore, hydrocarbons of low chlorination such as, for example, chloroethane can also be employed successfully as precipitants.

The optimum concentration of the polymer in the solvent depends on the molecular weight of the polymer and should be between 5 and 30%, by weight, based on the weight on the polymer and solvent, preferably between 8 and 20%, and hence in a range in which the polymer solution can be pumped and stirred without great effort.

The weight ratio of solvent to precipitant is determined by the chosen pair of substances. In general, the precipitant is added to the solution until a slightly turbidity indicates the start of the precipitation. Preferably, conditions, i.e. precipitants, are chosen such that the space-time yield is high and the evaporation costs are low. (The "space-time yield" is a known term in the art and means the yield of a product obtained referring to reaction volume and reaction time). This aim is achieved by employing good precipitants which are distinguished in that a small proportion gives a polycarbonate of high crystallinity within a short time. The best precipitant for a given solvent and polycarbonate may be determined by experimentation. For example, it has been determined that isopentane and chloroethane are godd precipitants for a Bisphenol A polycarbonate of $\eta_{rel}$ of 2.00 (measured on an 0.5% strength solution in methylene chloride at 25°C). As mentioned previously a high crystallinity is a degree of crystallinity corresponding to a melt enthalpy greater than 5.0 cal/g and preferably in the range of 5.5 to 8.0 cal/g.

It is also an important characteristic of the invention to use precipitants of which the boiling point under normal pressure, but also under reduced or elevated pressures, lies below the boiling points of the particular solvents used so that the precipitant can be removed from the polycarbonate solution by a distillative separation operation to produce a clear polycarbonate solution which can be converted into filaments and films. Precipitants having boiling points above the boiling points of the particular solvents are useful if they can be removed by azeotropic destillation.

The requisite degree of crystallinity of the precipitated polycarbonate is achieved after a dwell time of a few minutes to several hours.

The precipitants can be incorporated into the polycarbonate solution in various ways. The precipitant may be added dropwise to the solution with stirring. Rapid intensive mixing of the polycarbonate solution and the precipitant which is desirable to promote crystallization is achievable by using a mixing chamber.

The precipitant is added to the solution of the polycarbonate with the temperature of the solution being below the boiling point of the precipitant and/or below the boiling point of any azeotrope formed by the precipitant and the solvent for the polycarbonate. Thus for example when chloroethane (boiling point ≈ 13°C.) is added to a solution of polycarbonate in methylene chloride (boiling point ≈ 40.5°C.) the temperature of the solution should be less than 13°C. to prevent flashing of the chloroethane. It is also understood that the temperature of the solution including the precipitant should also be low to favor crystallization of the polycarbonate from the solution.

The speed of crystallization can be increased by adding crystal seeds during the precipitation. It is also advantageous if the precipitated product is kept in a finely divided form during the crystallization time by means of suitable stirrers, so that undisturbed material transport is insured.

The evaporation of the precipitant after crystallization has taken place is effected with the aid of known techniques such as, for example, distillation from a kettel via a column, evaporation by means of curtain evaporators or thin layer evaporators or by expansion evaporation.

The solutions manufactured in accordance with the process of the invention can then be converted in accordance with known techniques into filaments and films having excellent mechanical properties. (See U.S. Pat. No. 3,214,500 and British Pat. Nos. 902,580 and 902,581).

A better understanding of the process of the invention may be obtained by studying the following examples. In the examples the strengths of the solutions are in percent by weight.

EXAMPLE 1

At 12°C 82 ml of isopentane are added dropwise, with stirring, to 150 g of a 5% strength solution of a polycarbonate from 2,2-bis-(4-hydroxyphenyl)-propane ($\eta_{rel}$: 2.00; measured on an 0.5% strength solution in methylene chloride, 25°C) in methylene chloride. The solution becomes turbid and after standing for 8 hours the polycarbonate has largely precipitated in a solid partially crytalline form.

A sample of the product which has precipitated is filtered off on a suction filter, washed with isopentane and dried in vacuo at 110°C. The crystallinity is determined from the heat of melting of the crystalline parts of the solid polymer which melt at 250°–260°C. The heat of melting which is found, $\Delta H_S$, is 6.3 cal/g. The isopentane is distilled from the bulk of the material as an azeotrope with 27% by weight of methylene chloride (boiling point of azeotrope ≈ 26°C.). Distillation is carried out until the boiling point is 40.5°, the boiling point of methylene chloride which is indicative of the removal of the isopentane. During the distillation, the polymer which has precipitated redissolves and a slightly turbid solution is left. This solution can be spun to give filaments which are distinctly superior in their properties to the filaments from untreated polycarbonate solution, as is shown by the data in Table I.

Table I

|  | Filaments from Solutions according to Example 1 [a] | Filaments from Untreated Comparison Solution [a] |
| --- | --- | --- |
| Gauge after stretching | 60 f 30 dtex [x] | 60 f 30 dtex [x] |
| Tensile strength at 20% elongation | 2.12 g/dtex | 1.68 g/dtex |
| Heat shrinkage, 30 minutes at 180°C. | 26% | 43% |
| Interference width (degree) of the X-ray diagram | 1.20 | 1.85 |
| Crystalline proportion (from X-ray measurement) [b] | 15% | 5% |

[x] 60 f 30 dtex = dtex 60 f 30, that means 30 filaments each of them having 2 dtex; see R. Bauer, Chemiefaserlexikon, Deutscher Fachverlag Frankfurt/Main.
[a] A 15% by weight solution of the polycarbonate in $CH_2Cl_2$ has been spun with a spinning nozzle; the filaments are dried with hot air and are stretched at 215°C in a ratio of 1:7.
[b] Determined according to Hermans (Makromol. Chemie.64 (1963), pages 135–139).

EXAMPLE 2

150 g of a polycarbonate solution as in Example 1 are treated with 200 ml of chloroethane with stirring, at 2°C. After 60 minutes the mixture has solidified to give a paste. A sample is filtered off, washed with chloroethane and dried in vacuo at 110°C. $\Delta H_S$ = 7 cal/g (measured as in Example 1).

The chloroethane is evaporated from the main part of the material. The precipitated polycarbonate hereupon again dissolves and a slightly turbid solution is left, which can be converted into crystalline films and filaments having excellent properties.

EXAMPLE 3

150 g of a 5% strength solution of a polycarbonate based on 98 mol % of bis-(4-hydroxyphenyl)-propane-2,2 and 2 mol % of 1,4-bis-(4-hydroxyphenylisopropylidene)-benzene ($\eta_{rel}$: 2.06; measured on an 0.5% strength solution in methylene chloride, T = 25°C.) are treated, at 2°C., with 200 ml of chloroethane, with stirring. After 60 minutes, the mixture has solidified to a paste. A sample is filtered off, washed with chloroethane and dried in vacuo at 110°C. $\Delta H_S$ = 7.9 cal/g (measured as in Example 1).

The chloroethane is evaporated from the bulk of the material, whereupon the polycarbonate which has precipitated redissolves and a slightly turbid solution is left, which can be converted into crystalline films and filaments having excellent properties.

EXAMPLE 4

150 g of a polycarbonate solution, as in Example 1, is treated with 150 ml of isoprene with stirring. The polycarbonate precipitates in a partially crystalline form from the turbid solution. After 30 hours, a sample is taken and worked-up as described in Example 1. $\Delta H_S$ = 6.9 cal/g.

The isoprene is distilled from the residual solution through a column.

A solution is left which can be converted into crystalline films and filaments having similar properties to those in Example 1.

EXAMPLE 5

This example describes the continuous production of a polycarbonate solution suitable for the manufacture of films and filaments by precipitating the polycarbonate solutions with an isopentane-methylene chloride azeotrope (composition of the azeotropic mixture: 0.73 part of isopentane and 0.27 part of methylene chloride; boiling point 26°C.) and subsequent redissolving by distillation of the azeotropic mixture.

A stirred kettle cascade which consists of three units which can be heated, is employed. Reactor I has a usable capacity of 0.5 liter and reactors II and III have usable capacities of 1.0 liter each. Reactor III is provided with a distillation apparatus consisting of a column and condenser and in addition an apparatus is present which permits the distillates to be fed to the reactors I and II in the ratio of 1:1.

A 5% strength polycarbonate solution (basis: 4,4'-dihydroxy-diphenylpropane-2,2; molecular weight of the polycarbonate, 115,000) in methylene chloride as the solvent is fed into the reactor I at a throughput of 500 ml per hour and continuously mixed with the azeotropic mixture of isopentane and methylene chloride (250 ml per hour) obtained from reactor III by distillation, at 25°C. An intense turbidity of the polycarbonate solution is observed. In the reactor II, the polycarbonate solution which has been rendered turbid and is introduced from the reactor I is treated with further mixture (250 ml per hour) from the distillation from reactor III. In this step, a crystalline precipitate is formed, which can however still be stirred. The melt enthalpy of a sample which is isolated is found to be 5.8 cal/g of polycarbonate. This indicates a high crystallinity. The mixture from the reactor II is then fed into the reactor III where the continuous distillation of the isopentane-methylene chloride azeotrope takes place. The precipitate formed in reactor II again dissolves and the slightly turbid polycarbonte solution which issues from the reactor III only retains small amounts of isopentane which distil, together with the solvent, in a subsequent evaporation stage in which the polycarbonate solution is concentrated to a spinning concentration of approx. 12% of solids.

The isopentane constituents which are removed with the polycarbonate solution from the circulation system are continuously replaced by adding fresh isopentane to reactor I.

The resulting polycarbonate solution is used for the manufacture of filaments. The spun filaments have the properties indicated in Example 1.

While the invention has been described in conjunction with the foregoing preferred processes, it will be understood that it is not intended to limit the invention to those processes. On the contrary, it is intended to cover all alternatives, modifications and equivalents as may be included within the spirit and scope of the invention as defined by the appended claims.

What is claimed is:

1. A process for the manufacture of solutions of high molecular weight aromatic polycarbonates suitable for the production of filaments and films, comprising precipitating said polycarbonate, having a molecular weight greater than 30,000, from its solution in a chlorinated hydrocarbon or aromatic hydrocarbon solvent by the addition of a non-solvent for said polycarbonate to the solution and subsequently redissolving the resulting precipitated polycarbonate by evaporating off said non-solvent.

2. The process of claim 1 wherein the precipitation is carried out in the presence of crystal seeds.

3. The process of claim 1 wherein the solvent is a chlorinated hydrocarbon and the non-solvent for said polycarbonate is a hydrocarbon having 2–8 C atoms.

4. The process of claim 1 wherein the polycarbonate is a polycarbonate based on 4,4'-dihydroxydiphenyl-propane-2,2.

5. The process of claim 1 wherein the polycarbonate is a copolycarbonate which is 99.8–95 mol % bis-(4-hydroxyphenyl)-propane-2,2 and 0.2 - 5 mol % 1,4-bis-(4-hydroxyphenylisopropylidene)-benzene.

6. The process of claim 1 wherein the precipitated polycarbonate has a melt enthalpy $\Delta H_S$ of at least 5.0 cal/g.

7. A solution of a high molecular weight aromatic polycarbonate, said polycarbonate having molecular weight greater than 30,000, for the manufacture of fibers and films, manufactured by the process which comprises precipitating largely crystalline polycarbonate from its solution in a chlorinated hydrocarbon or aromatic hydrocarbon solvent by the addition of a non-solvent for said polycarbonate to the solution and subsequently redissolving the precipitated polycarbonate by evaporating off said non-solvent.

8. The process of claim 1 wherein the precipitated polycarbonate has a melt enthalpy, $\Delta H_S$, of between 5.5 and 8.0 cal/g.

9. A process for the manufacture of solutions of polycarbonates having molecular weight greater than 30,000, said solutions being especially suitable for the production of filaments and films, comprising the steps of:

a. adding to an initial solution of polycarbonate in a chlorinated hydrocarbon or aromatic hydrocarbon solvent, said polycarbonate having a molecular weight greater than 30,000, a non-solvent for said polycarbonate in an amount sufficient to cause a slight turbidity in the solution of polycarbonate and solvent, b. allowing the polycarbonate to precipitate from the said solution of polycarbonate and said solvent until the precipitated polycarbonate attains a degree of crystallinity such that the melt enthalpy of the precipitated polycarbonate is greater than 5.0 cal/g, and c. thereafter, redissolving the precipitated polycarbonate into the said solvent by evaporating off said non-solvent.

10. The process of claim 9 wherein the polycarbonate is initially present in said solvent in an amount of between 5 to 30 weight %.

11. The process of claim 9 wherein the non-solvent has a boiling point that is lower than the boiling poing of said solvent.

* * * * *